United States Patent
Zhang et al.

(10) Patent No.: US 7,522,967 B2
(45) Date of Patent: Apr. 21, 2009

(54) AUDIO SUMMARY BASED AUDIO PROCESSING

(75) Inventors: Tong Zhang, San Jose, CA (US); Ramin Samadani, Menlo Park, CA (US); Yining Deng, Sunnyvale, CA (US); Ken K. Lin, Redwood City, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 711 days.

(21) Appl. No.: 10/611,449

(22) Filed: Jul. 1, 2003

(65) Prior Publication Data

US 2005/0004690 A1      Jan. 6, 2005

(51) Int. Cl.
*G06F 17/00* (2006.01)
(52) U.S. Cl. .................................................. 700/94
(58) Field of Classification Search .............. 381/94.5; 369/30.04, 30.08, 30.3, 2–3
See application file for complete search history.

(56) References Cited

U.S. PATENT DOCUMENTS

| | | | |
|---|---|---|---|
| 4,792,934 A * | 12/1988 | Masaki ..................... | 369/30.3 |
| 5,105,401 A * | 4/1992 | Aoyagi et al. ............ | 369/30.04 |
| 5,126,987 A * | 6/1992 | Shiba et al. .............. | 369/30.03 |
| 5,408,449 A * | 4/1995 | Oh .......................... | 369/30.04 |
| 5,664,227 A | 9/1997 | Mauldin et al. | |
| 6,009,438 A | 12/1999 | Kawasaki et al. | |
| 6,044,047 A * | 3/2000 | Kulas ....................... | 369/34.01 |
| 6,128,255 A * | 10/2000 | Yankowski ............... | 369/30.08 |
| 6,225,546 B1 | 5/2001 | Kraft et al. | |
| 6,332,145 B1 | 12/2001 | Kawasaki et al. | |
| 6,424,793 B1 * | 7/2002 | Setogawa et al. ........ | 369/30.04 |

(Continued)

FOREIGN PATENT DOCUMENTS

WO    WO00/52914    8/2000

(Continued)

OTHER PUBLICATIONS

U.S. Appl. No. 60/465,156 to Csicatka et al., filed Apr. 24, 2003.*

(Continued)

*Primary Examiner*—Curtis Kuntz
*Assistant Examiner*—Joseph Saunders, Jr.

(57) ABSTRACT

In one aspect, audio summaries and transition audio segments are sequentially rendered with at least one transition audio segment rendered between each pair of sequential audio summaries. Each audio summary comprises digital content summarizing at least a portion of a respective associated audio piece. In another aspect, an original audio file is annotated by embedding therein information enabling rendering of at least one audio summary contained in the annotated audio file and comprising digital content summarizing at least a portion of the original audio file. In another aspect, an original audio file is annotated by providing at least one browsable link between the original audio file and at least one audio summary comprising digital content summarizing at least a portion of the original audio file, and storing the original audio file, the at least one browsable link, and the at least one audio summary on a common portable storage medium. In another aspect, an audio piece is divided into audio segments. Acoustical features are extracted from each audio segment. Audio segments are grouped into clusters based on the extracted features. A representative audio segment is identified in each cluster. A representative audio segment is selected as an audio summary of the audio piece.

41 Claims, 4 Drawing Sheets

U.S. PATENT DOCUMENTS

| | | | | |
|---|---|---|---|---|
| 6,807,450 | B1 * | 10/2004 | Takenaka et al. | 700/94 |
| 6,918,081 | B1 * | 7/2005 | Jun | 715/210 |
| 2002/0120752 | A1 * | 8/2002 | Logan et al. | 700/94 |
| 2003/0037664 | A1 * | 2/2003 | Comair et al. | 84/609 |
| 2004/0002310 | A1 * | 1/2004 | Herley et al. | 455/179.1 |
| 2006/0235550 | A1 * | 10/2006 | Csicsatka et al. | 700/94 |

FOREIGN PATENT DOCUMENTS

WO     WO 2004097832 A2 * 11/2004

OTHER PUBLICATIONS

Turk et al., "A Sound Source Classification System Based on Sub-band Processing," Proc. 3rd IEEE Benelux Signal Processing Symposium (SPS-2002), Leuven, Belgium, Mar. 21-22, 2002.

Foote et al., "Media Segmentation using Self-Similarity Decomposition," Proceedings of SPIE 2003.

Tzanetakis et al., "Beyond the query-by-example paradigm: new query interfaces for music information retrieval," Proc. International Computer Music Conference, Gothen borg, Sweden, Sep. 2002.

Bartsch et al., "To catch a chorus: using chroma-based representations for audio thumbnailing," IEEE Workshop on Applications of Signal Processing to Audio and Acoustics 2001.

* cited by examiner

FIG. 8

AUDIO SUMMARY BASED AUDIO PROCESSING

TECHNICAL FIELD

This invention relates to audio summary based audio processing systems and methods.

BACKGROUND

Individuals and organizations are rapidly accumulating large collections of audio content. As these collections grow, individuals and organizations increasingly will require systems and methods for organizing and summarizing the audio content in their collections so that desired audio content may be found quickly and easily. To meet this need, a variety of different systems and methods for summarizing and browsing audio content have been proposed. For example, a variety of different audio summarization approaches have focused on generating and browsing audio thumbnails, which are short, representative portions of original audio pieces.

In one approach for generating audio thumbnails, an audio piece is divided into uniformly spaced segments. Mel frequency cepstral coefficients (MFCCs) are computed for each segment. The segments then are clustered by thresholding a symmetric KL (Kullback-Leibler) divergence measure. The longest component of the most frequent cluster is returned as an audio thumbnail.

Another audio thumbnail based approach analyzes the structure of digital music based on a similarity matrix, which contains the results of all possible pairwise similarity comparisons between time windows in a digital audio piece. The similarity matrix is used to visualize and characterize the structure of the digital audio piece. The digital audio piece is segmented by correlating a kernel along a diagonal of the similarity matrix. Once segmented, spectral characteristics of each segment are computed. Segments then are clustered based on the self-similarity of their statistics. The digital audio piece is summarized by selecting clusters with repeated segments through the file.

In one audio thumbnail based approach, computer readable data representing a musical piece is received and an audio summary that includes the main melody of the musical piece is generated. A component builder generates a plurality of composite and primitive components representing the structural elements of the musical piece and creates a hierarchical representation of the components. The most primitive components, representing notes within the musical piece, are examined to determine repetitive patterns within the composite components. A melody detector examines the hierarchical representation of the components and uses algorithms to detect which of the repetitive patterns is the main melody of the musical piece. Once the main melody is detected, the segment of the musical data containing the main melody is provided in one or more formats. Musical knowledge rules representing specific genres of musical styles may be used to assist the component builder and melody detector in determining which primitive component patterns are the most likely candidates for the main melody.

In one known method for skimming digital audio/video (A/V) data, the video data is partitioned into video segments and the audio data is transcribed. Representative frames from each of the video segments are selected. The representative frames are combined to form an assembled video sequence. Keywords contained in the corresponding transcribed audio data are identified and extracted. The extracted keywords are assembled into an audio track. The assembled video sequence and audio track are output together.

SUMMARY

In one aspect, the invention features an audio processing scheme in accordance with which audio summaries and transition audio segments are sequentially rendered with at least one transition audio segment rendered between each pair of sequential audio summaries. Each audio summary comprises digital content summarizing at least a portion of a respective associated audio piece.

In another aspect, the invention features a scheme for generating an annotated audio file. In accordance with this inventive scheme, an original audio file is annotated by embedding therein information enabling rendering of at least one audio summary contained in the annotated audio file and comprising digital content summarizing at least a portion of the original audio file.

In another aspect of the invention, an original audio file is annotated by providing at least one browsable link between the original audio file and at least one audio summary comprising digital content summarizing at least a portion of the original audio file, and storing the original audio file, the at least one browsable link, and the at least one audio summary on a common portable storage medium.

In another aspect, the invention features a portable medium that is readable by an electronic device and tangibly stores an original audio file, at least one audio summary comprising digital content summarizing at least a portion of an original audio file, and at least one browsable link between the original audio file and the at least one audio summary.

In another aspect of the invention, an audio piece is divided into audio segments. Acoustical features are extracted from each audio segment. Audio segments are grouped into clusters based on the extracted features. A representative audio segment is identified in each cluster. A representative audio segment is selected as an audio summary of the audio piece.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein, "audio summary" refers to any digital content that summarizes (i.e., represents, symbolizes, or brings to mind) the content of an associated original audio piece. An audio piece may be any form of audio content, including music, speech, audio portions of a movie or video, or other sounds. The digital content of an audio summary may be in the form of one or more of text, audio, graphics, animated graphics, and full-motion video. For example, in some implementations, an audio summary may be an audio thumbnail (i.e., a representative sample or portion of an audio piece).

The audio summaries that are browsed and rendered in the embodiments described below may be generated by any known or yet to be developed method, process, or means. For example, in some implementations, audio summaries are generated by randomly selecting segments (or thumbnails) of respective audio pieces. Each segment may have the same or different rendering duration (or length). In another example, audio thumbnails may be automatically generated by extracting segments of respective audio pieces in accordance with predefined rules (e.g., segments of predefined lengths and starting locations may be extracted from near the beginnings or endings of respective audio pieces). In some instances, at least some audio summaries are generated by the method described in section II below.

I. System Overview

Figure 1:
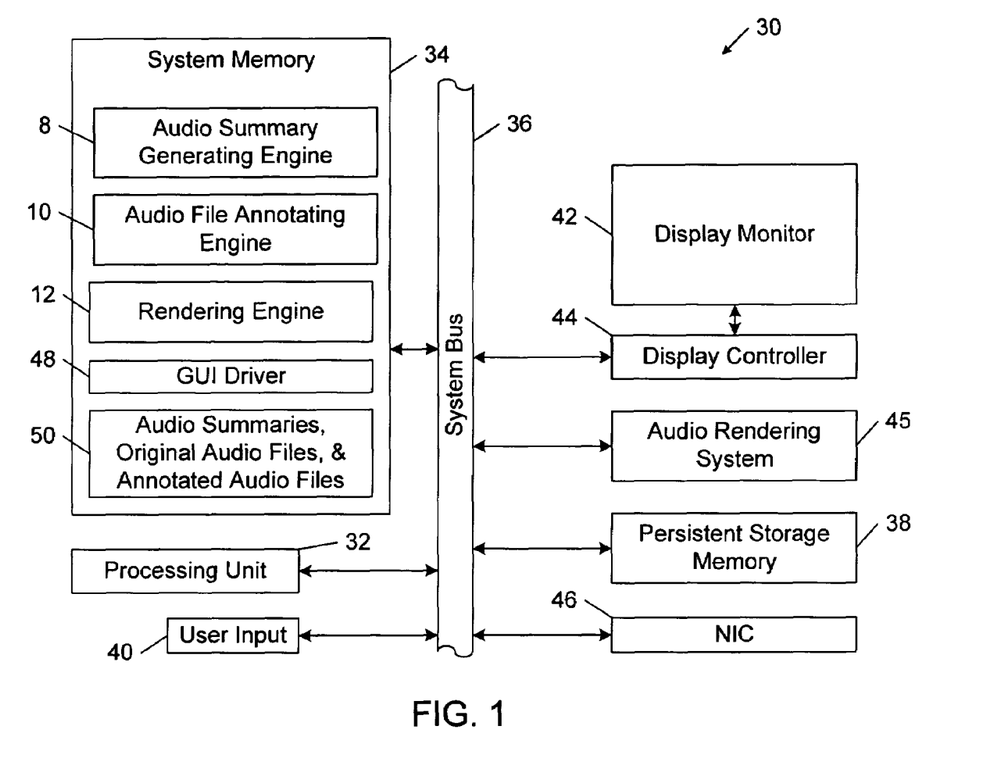
FIG. 1 is a block diagram of an embodiment of a system for generating and rendering audio summaries and annotated audio files.

Referring to FIG. 1, in one embodiment, a system for generating and rendering audio summaries and annotated audio files includes an audio summary generating engine 8, an audio file annotating engine 10, and rendering engine 12. These engines 8-12 may be configured to operate on any suitable electronic device, including a computer (e.g., desktop, laptop and handheld computer), a digital audio player, or any suitable audio capturing, audio editing, or audio rendering system.

In a computer-based implementation, audio summary generating engine 8, audio file annotating engine 10, and rendering engine 12 may be implemented as one or more respective software modules operating on a computer 30. Computer 30 includes a processing unit 32, a system memory 34, and a system bus 36 that couples processing unit 32 to the various components of computer 30. Processing unit 32 may include one or more processors, each of which may be in the form of any one of various commercially available processors. System memory 34 may include a read only memory (ROM) that stores a basic input/output system (BIOS) containing start-up routines for computer 30 and a random access memory (RAM). System bus 36 may be a memory bus, a peripheral bus or a local bus, and may be compatible with any of a variety of bus protocols, including PCI, VESA, Microchannel, ISA, and EISA. Computer 30 also includes a persistent storage memory 38 (e.g., a hard drive, a floppy drive, a CD ROM drive, magnetic tape drives, flash memory devices, and digital video disks) that is connected to system bus 36 and contains one or more computer-readable media disks that provide non-volatile or persistent storage for data, data structures and computer-executable instructions. A user may interact (e.g., enter commands or data) with computer 30 using one or more input devices 40 (e.g., a keyboard, a computer mouse, a microphone, joystick, and touch pad). Information may be presented through a graphical user interface (GUI) that is displayed to the user on a display monitor 42, which is controlled by a display controller 44. Audio may be rendered by an audio rendering system 45, which may include a sound card and one or more speakers. One or more remote computers may be connected to computer 30 through a network interface card (NIC) 46.

As shown in FIG. 1, system memory 34 also stores audio summary generating engine 8, audio file annotating engine 10, rendering engine 12, a GUI driver 48, and a database 50 containing one or more audio summaries, original audio files, and annotated audio files. In some implementations, audio summary generating engine 8 and audio file annotating engine 10 both interface with the GUI driver 48, the original audio files, and the user input 40 to control the generation of audio summaries and annotated audio files, respectively. Rendering engine 12 interfaces with audio rendering system 45, the audio summaries, the original audio files, and the annotated audio files to enable a user to playback and browse the collection of audio content in database 50. The audio summaries, the original audio files, and the annotated audio files in the collection to be rendered and browsed may be stored locally in persistent storage memory 38 or stored remotely and accessed through NIC 46, or both.

II. Generating Audio Summaries

Figure 2:
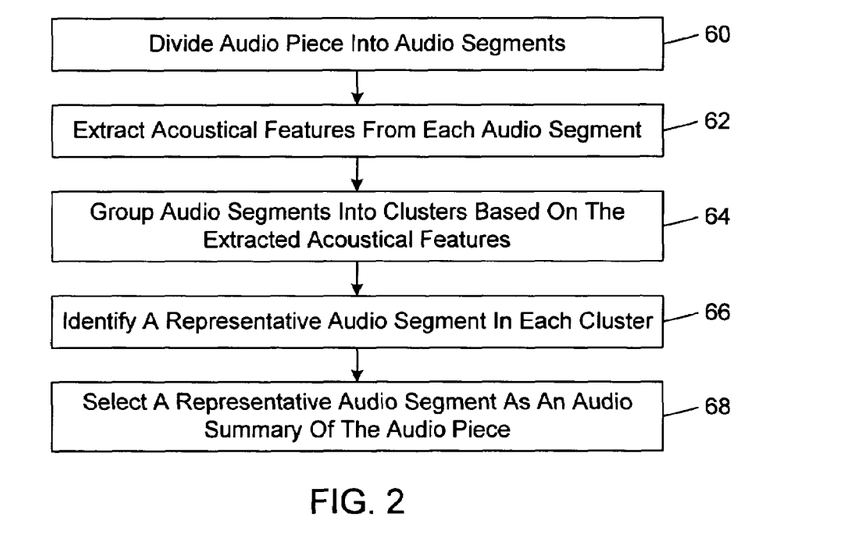
FIG. 2 is a flow diagram of an embodiment of a method of generating an audio summary.

Referring to FIG. 2, in some embodiments, audio summary generating engine 8 generates an audio summary of an audio piece as follows. The audio piece is divided into audio segments (step 60). In some implementations, the audio piece is divided into segments having substantially the same length (e.g., segments have a rendering duration of a preselected number of seconds). Acoustical features are extracted from each audio segment (step 62). The acoustical features may correspond to one or more types of acoustical features, including tonality, beat frequencies, and loudness. The audio segments are grouped into clusters based on the extracted acoustical features (step 64). The audio segments may be grouped into a preselected number of clusters. In some implementations, the audio segments are grouped into clusters using an LBG vector quantizer design algorithm (see, e.g., Linde, Y., Buzo, A., and Gray, R. M., "An algorithm for vector quantizer design," IEEE Transactions on Communications COM-28, pp.84-95 (1980), which is incorporated herein by reference). A representative audio segment is identified in each cluster (step 66). In some implementations, a centroid of a preselected acoustical feature vector is computed for each cluster and the audio segment in each cluster that is closest to the centroid is identified as the representative audio segment for the corresponding cluster. From the set of representative audio segments, one representative audio segment is selected as an audio summary of the audio piece (step 68). In some implementations, clusters are ranked in order of the respective numbers of audio segments in the clusters and the representative segment of the highest ranking cluster is selected as the audio summary for the audio piece.

III. Generating Annotated Audio Files

The embodiments described below feature systems and methods of generating annotated audio files from original audio files, which may or may not have been previously annotated. An audio file is a stored representation of an audio piece. An audio file may be formatted in accordance with any uncompressed or compressed digital audio format (e.g., CD-Audio, DVD-Audio, WAV, AIFF, WMA, and MP3). An audio file may be annotated by associating with the audio file information enabling the rendering of at least one audio summary that includes digital content summarizing at least a portion of the associated original audio file. In some embodiments, an annotated audio file is generated by embedding information enabling the rendering of at least one audio summary that is contained in the annotated audio file. In other embodiments, an audio file is annotated by linking at least one audio summary to the original audio file and storing the linked audio summary and the original audio file together on the same portable storage medium. In this way, the audio summaries are always accessible to a rendering system because the contents of both the original audio file and the audio summaries are stored together either as a single file or as multiple linked files on a common storage medium. Users may therefore quickly and efficiently browse through a collection of annotated audio files without risk that the audio summaries will become disassociated from the corresponding audio files, regardless of the way in which the audio files are transmitted from one rendering system to another.

A. Embedding Audio Summary Rendering Information

Figure 3:
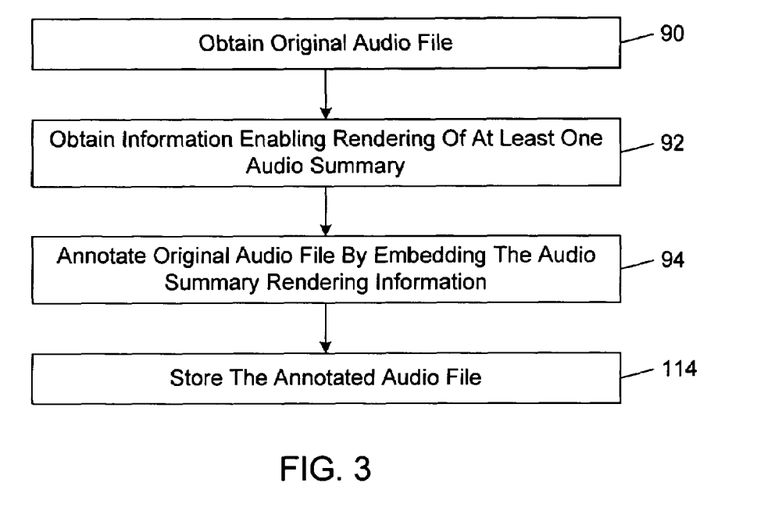
FIG. 3 is a flow diagram of an embodiment of a method of generating an annotated audio file.

Referring to FIG. 3, in some embodiments, an annotated audio file may be generated as follows. Audio file annotating engine 10 obtains an original audio file (step 90). Audio file annotating engine 10 also obtains information that enables at least one audio summary to be rendered (step 92). Audio file annotating engine 10 annotates the original audio file by embedding the audio summary rendering information in the original audio file (step 94).

Figure 4A:
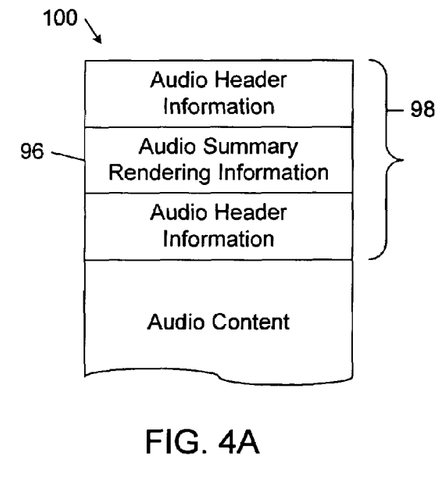
FIG. 4A is a diagrammatic view of audio summary rendering information embedded in a header of an audio file.
Figure 4B:
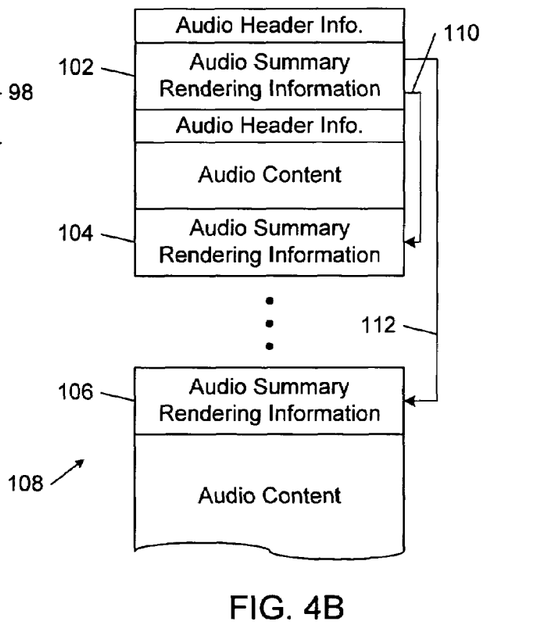
FIG. 4B is a diagrammatic view of audio summary rendering information embedded at different locations in an audio file.

Referring to FIGS. 4A and 4B, in some embodiments, audio summary rendering information 96 is embedded in the header 98 of an original audio file 100 (FIG. 4A). In other embodiments, audio summary rendering information 102, 104, 106 are embedded at different respective locations (e.g., locations preceding each segment or paragraph) of an original audio file 108 separated by audio content of the original audio file 108 (FIG. 4B). In some of these embodiments, pointers 110, 112 to the locations of the other audio summary rendering information 104, 106 may be embedded in the header of the original audio file 108, as shown in FIG. 4B.

In some implementations, the audio summary rendering information that is embedded in the original audio file corresponds to the audio summary itself. As mentioned above, an audio summary is any digital content (e.g., text, audio, graphics, animated graphics, and full-motion video) that summarizes (i.e., represents, symbolizes, or brings to mind) the content of the associated original audio file. Accordingly, in these implementations, the digital contents of the audio summaries are embedded in the original audio files. An embedded audio summary may be generated in any of the ways described herein. In some implementations, an audio summary may be derived from the original audio file (e.g., an audio thumbnail). In other implementations, an audio summary may be obtained from sources other than the original audio file yet still be representative of the original audio file (e.g., a trailer of a commercial motion picture, an audio or video clip, or a textual description of the original audio file).

Referring back to FIG. 3, after the audio file has been annotated, audio file annotating engine 10 stores the annotated audio file (step 114). For example, the annotated audio file may be stored in persistent storage memory 38 (FIG. 1).

B. Linking and Storing Audio Summaries and Original Audio Files

In some embodiments, an annotated audio file may be generated by linking at least one audio summary to the original audio file and storing the linked audio summary and original audio file together on the same portable storage medium. In this way, the original audio file is annotated by the one or more linked audio summaries. The links between audio summaries and original audio files may be stored in the audio summaries or in the original audio files. For example, the links may be stored in the headers of the audio summaries or in the headers of the original audio files, or both. Each link contains at least one location identifier (e.g., a file locator or a Uniform Resource Locator (URL)) that enables rendering engine 12 to browse from an audio summary to the linked original audio file, or vice versa. The portable storage medium may be any portable storage device on which digital audio summaries and original digital audio files may be stored, including CD-ROMs, rewritable CDs, DVD-ROMs, rewritable DVDs, laser disks, semiconductor memory devices (e.g., EPROM, EEPROM, and flash memory devices), magnetic disks (e.g., internal hard disks of portable electronic devices and removable hard disks), and magneto-optical disks.

In these embodiments, rendering engine 12 is configured to detect whether one or more audio summaries are stored on a portable storage medium. If at least one audio summary is detected, rendering engine 12 renders the audio summary and the linked original audio file in accordance with predetermined rendering rules. For example, rendering engine 12 first may render all of the audio summaries in a predefined sequence. During the rendering of each audio summary, a user may request that rendering engine 12 render the original audio file linked to the audio summary currently being rendered. In this way, the user may quickly browse the collection of original audio files stored on the portable storage medium. If rendering engine 12 detects original audio files on portable storage medium but does not detect any audio summaries on the portable storage medium, rendering engine 12 may render the detected original audio files in accordance with any known audio file playback method (e.g., automatically render each original audio file in a predefined sequence).

Figure 5:
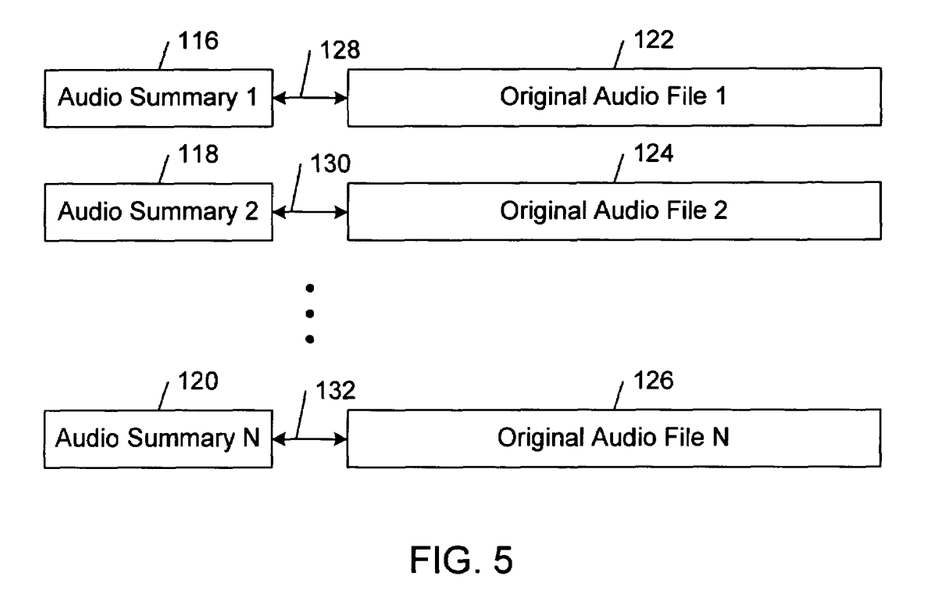
FIG. 5 is a diagrammatic view of multiple audio summaries each linked to a respective audio file configured for storage on a portable storage medium.

FIG. 5 shows an exemplary embodiment in which each of multiple audio summaries 116, 118, 120 is linked to a respective original audio file 122, 124, 126 by respective links (or pointers) 128, 130, 132. The audio summaries 116, 118, 120, original audio files 122-126, and links 128-132 are stored on the same portable storage medium. Rendering engine 12 recognizes each link 128-132 and follows each link between pairs of linked audio summaries and original audio files. In one exemplary implementation, the original audio files 122-126 are numbered tracks of digital audio music and the audio summaries 116-120 are digital contents summarizing each of the linked original audio files. The links 128-132 may be implemented by associating with each audio summary the same track number of the associated original audio file. In this way, if enabled to detect audio summaries, rendering engine 12 identifies linked pairs of audio summaries and original audio files by track number. An un-enabled audio rendering engine (e.g., a conventional digital music CD player) ignores the undetected audio summaries and rendering the original audio files (or tracks) in a conventional way. In the implementation illustrated in FIG. 5, N is an integer greater than two and, therefore, FIG. 5 shows a representation of three or more sets of linked audio summaries and original audio files. In other implementations, fewer than three sets of linked audio summaries and original audio files are stored on the same portable storage medium.

IV. Rendering Annotated Audio Files

Figure 6:
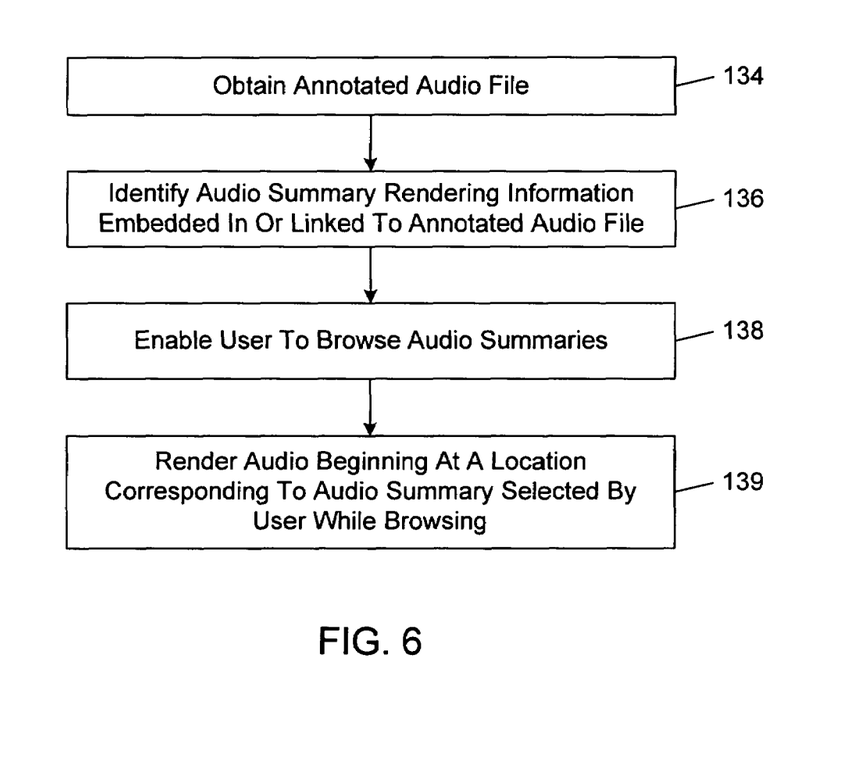
FIG. 6 is a flow diagram of an embodiment of a method of rendering an annotated audio file.

Referring to FIG. 6, in some embodiments, an annotated audio file may be rendered by rendering engine 12 as follows. Rendering engine 12 obtains an audio file that has been annotated in one or more of the ways described in section III above (step 134). Rendering engine 12 identifies audio summary rendering information that is embedded in or linked to the annotated audio file (step 136). As explained above, the audio summary rendering information may correspond to one or more audio summaries that are embedded in or linked to the header or other locations of the annotated audio file. Alternatively, the audio summary rendering information may correspond to one or more pointers to locations where respective audio summaries are embedded in or linked to the annotated audio file. Based on the audio summary rendering information, rendering engine 12 enables a user to browse the summaries embedded in or linked to the annotated audio file (step 138). Rendering engine 12 initially may render audio summaries at the lowest (i.e., most coarse) level of detail. For example, in some implementations, rendering engine 12 initially may present to the user the highest ranking audio summaries representative of clusters of audio segments identified by the audio summary generating method described above in section II. If the user requests summaries to be presented at a greater level of detail, rendering engine 12 may render the audio summaries at a greater level of detail (e.g., render all of the audio summaries in a particular cluster).

In some implementations, while the user is browsing audio summaries, the user may select a particular summary as corresponding to the starting point for rendering the original audio file. In response, rendering engine 12 renders the original audio file beginning at the point corresponding to the audio summary selected by the user (step 139).

V. Rendering an Audio Sequence Including Audio Summaries

Figure 7:
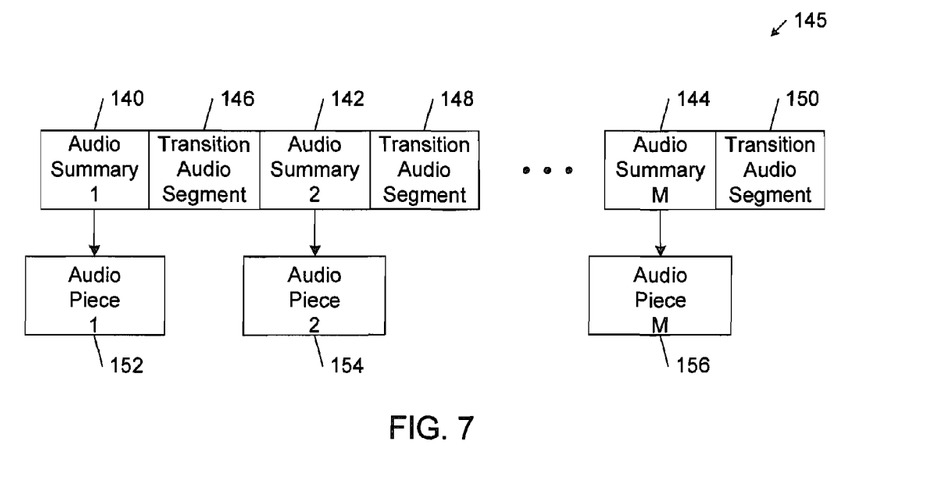
FIG. 7 is a diagrammatic view of a sequence of audio summaries and transition audio segments and audio pieces respectively linked to associated audio summaries in the sequence.

Referring to FIG. 7, in some embodiments, rendering engine 12 may render audio summaries 140, 142, 144 in an audio sequence 145. The audio summaries 140-144 are separated by respective transition audio segments 146, 148, 150. The audio summaries 140-144 and transition audio segments 146-150 may be concatenated and rendered in real time. In the illustrated embodiment, rendering engine 12 sequentially renders audio summaries 140-144 and transition audio segments 146-150 with one transition audio segment rendered between each pair of sequential audio summaries. In some implementations, rendering engine 12 renders all of the audio summaries 140-144 normalized to the same loudness level. Audio pieces 152, 154, 156 are linked to a corresponding representative audio summary 140, 142, 144. In some implementations, one or more audio pieces may be linked to multiple representative audio summaries that are incorporated into audio sequence 145. In the implementation illustrated in FIG. 7, M is an integer greater than two and, therefore, FIG. 7 shows a representation of three or more sets of linked audio summaries and audio pieces. In other implementations, fewer than three sets of linked audio summaries and audio pieces are incorporated into audio sequence 145.

As used herein, the term "transition audio segment" refers to any form of audio content that is sufficiently different from the audio summaries that a user is able to distinguish the transition audio segments from the audio summaries. The transition audio segments in audio sequence 145 may be the same or they may be different. In some implementations, each of the transition audio segments corresponds to a monotone sound. In other implementations, each of the transition audio segments is represented in the time domain by a Gaussian weighted sinusoid (or Gabor function) with a characteristic center frequency and width (or standard deviation). The center frequency of the Gabor function may be in the middle of the audible frequency range. In one implementation, the center frequency of the Gabor function is in the range of about 150-250 Hz. In some implementations, the center frequency of the Gabor function representing a transition audio segment has a center frequency that substantially corresponds to the center pitch of an adjacent audio summary in the sequence (e.g., either the audio summary preceding or following the transition audio segment in audio sequence 145).

In some implementations, the audio summaries 140-144 and transition audio segments 146-150 are rendered consecutively, with no gaps between the audio summaries and the transition audio segments. In one exemplary implementation, each audio summary 140-144 is three seconds long and each transition audio segment is one second long. Assuming that each audio summary is associated with a different respective audio piece, a user may browse three hundred audio pieces in twenty minutes. If each original audio piece is three minutes long, for example, it would take fifteen hours for a user to listen to all three hundred audio pieces. That is, by rendering audio summaries rendering engine 12 enables a user to browse all three hundred audio pieces forty five times faster than if the original audio pieces were rendered.

In some implementations, each audio piece is associated with a hierarchical cluster of audio summaries. In these implementations, during rendering of a given audio summary, a user may request the rendering engine 12 to render additional audio summaries in the same cluster. In response, the rendering audio engine 12 may render audio summaries in the cluster in accordance with the predefined hierarchical order until the user requests to resume the rendering of the audio sequence 145.

In some implementations, a user may interact with a graphical user interface to specify a category for each audio summary while the sequence 145 of audio summaries and transition audio segments are being rendered. In some implementations, during the rendering of a given audio summary a user may specify an input (e.g., "yes" or "no") indicating whether or not the audio piece associated with the given audio summary should be added to a playlist. The rendering engine 12 stores the user-specified categories and builds one or more playlists based on the stored categories.

Figure 8:
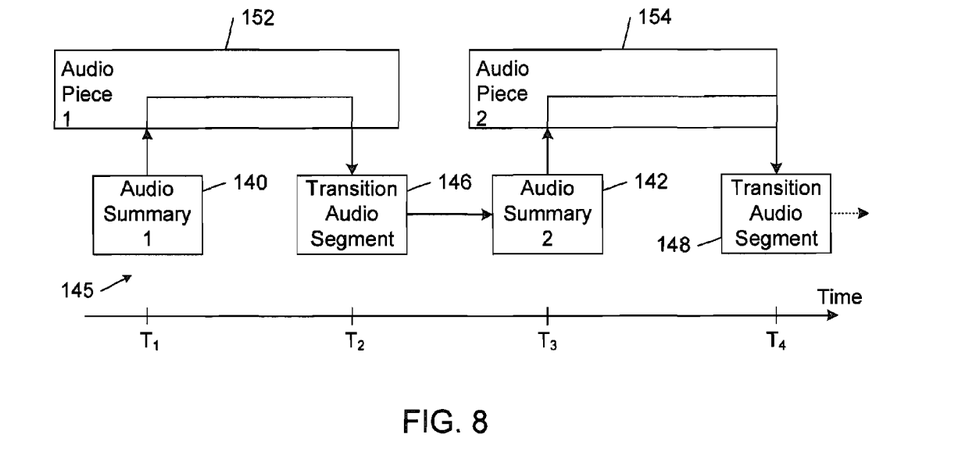
FIG. 8 is a diagrammatic view of a pair of audio pieces being browsed by means of associated audio summaries.

Referring to FIG. 8, in some implementations, each audio summary may be associated with a pointer to a location in an audio piece (e.g., the location in the audio piece from which the audio summary was extracted). In these implementations, rendering engine 12 allows the user to jump back and forth between rendering audio summaries and rendering audio pieces. For example, rendering engine 12 initially may begin to render the sequence 145 of audio summaries 140-144 and transition audio segments 146-150. In response to user input at time $T_1$, rendering engine 12 follows a pointer from a given audio summary 140 being rendered to the corresponding audio piece 152 and begins rendering the audio piece 152 at the location specified by the pointer. In response to user input at time $T_2$, rendering engine 12 terminates rendering of audio piece 152 and resumes rendering audio sequence 145 by rendering transition audio segment 146 followed by audio summary 142. In response to user input at time $T_3$, rendering engine 12 follows a pointer from a given audio summary 142 being rendered to the corresponding audio piece 154 and begins rendering the audio piece 154 at the location specified by the pointer. If the end of the audio piece 154 is reached without any intervening user input, the rendering engine 12 resumes rendering audio sequence 145 by rendering the successive transition audio segment 148 after the end of audio piece 154 has been rendered (i.e., at time $T_4$).

In some implementations, rendering engine 12 is configured to render each audio piece beginning at the location of its associated audio summary. Rendering engine 12 renders the entire audio piece unless it receives user input. The user input may correspond to a preselected category, such as "yes" or "no", indicating whether or not to add the particular piece being rendered to a playlist. In response to user input or after the current audio piece has been rendered, the rendering engine 12 begins to render the successive audio piece beginning at the location of its associated audio summary. In some implementations, if an audio piece ends without any user category selection, the audio piece is added to the current playlist (e.g., "yes" category) by default.

In some embodiments, rendering engine 12 is configured to allow a user to browse audio summaries based on a similarity measure. In these embodiments, audio summary generating engine 8 sorts audio summaries based on their acoustic feature vector distances to one another. One or more acoustical features may be used in the computation of acoustic feature vector distances. Feature vector distances may be computed using any one of a wide variety of acoustic feature vector distance measures. In response to a user request to browse based on similarity, rendering engine 12 begins rendering the audio summaries in order of feature vector closeness to the audio summary that was being rendered when the user request was received.

VI. Conclusion

Other embodiments are within the scope of the claims.

The systems and methods described herein are not limited to any particular hardware or software configuration, but rather they may be implemented in any computing or processing environment, including in digital electronic circuitry or in computer hardware, firmware, or software.

What is claimed is:

1. An audio processing method, comprising:
    identifying audio summaries of respective audio pieces, wherein each of the audio summaries comprises digital content summarizing at least a portion of the respective audio piece, and the identifying comprises for each of the audio pieces
        selecting constituent segments of the audio piece as its respective ones of the audio summaries and
        ranking its audio summaries into different levels of a respective audio summary hierarchy;
    determining transition audio segments each comprising a form of audio content that is different from the audio summaries and distinguishes the transition audio segment from the audio summaries;
    concatenating the transition audio segments and ones of the audio summaries ranked at a selected level of the audio summary hierarchies into a sequence in which at least one of the transition audio segments is between successive ones of the audio summaries; and
    rendering the sequence.

2. The method of claim 1, wherein identical transition audio segments are rendered between pairs of sequential audio summaries.

3. The method of claim 1, wherein each of the transition audio segments corresponds to a Gabor function in a time domain representation, and each of the Gabor functions has a respective center frequency substantially corresponding to a center pitch of an adjacent one of the audio summaries in the sequence.

4. The method of claim 1, wherein the audio summaries and the interleaved transition audio segments are rendered consecutively.

5. The method of claim 1, wherein each audio summary is a representative segment of a respective associated audio piece.

6. The method of claim 1, further comprising classifying audio pieces into categories in response to user input received during rendering of the associated audio summaries.

7. The method of claim 6, further comprising building a playlist based on categories assigned to a set of audio pieces.

8. The method of claim 1, wherein at least one audio summary is linked to an associated audio piece by a browsable link.

9. The method of claim 8, further comprising rendering a given one of the audio pieces linked by a browsable link to an associated one of the audio summaries in response to user input received during rendering of the associated audio summary, wherein the rendering comprises following the browsable link from the associated audio summary to the given audio piece before rendering a successive one of the transition audio segments.

10. The method of claim 1, further comprising rendering a given audio piece beginning at a location in the given audio piece linked by a browsable link to an audio summary associated with the given audio piece, wherein the rendering comprises following the browsable link from the associated audio summary to the given audio piece.

11. The method of claim 10, further comprising rendering a second audio piece at a location in the second audio piece linked to a successive audio summary associated with the second audio piece.

12. The method of claim 1, further comprising normalizing audio summaries to a common loudness level.

13. The method of claim 1, further comprising following links between multiple ones of the audio summaries and one of the audio pieces.

14. The method of claim 1, wherein each of the transition audio segments corresponds to a monotone sound.

15. The method of claim 1, wherein the rendering comprises rendering the audio summaries and the transition audio segments consecutively without any gaps between the audio summaries and the transition audio segments.

16. The method of claim 1, further comprising, in response to user input during rendering of a current one of the audio summaries that comprises digital content summarizing at least a portion of a given one of the audio pieces, rendering another audio summary in a hierarchical cluster of audio summaries each of which comprises digital content summarizing at least a portion of the given audio piece, wherein the hierarchical cluster includes the current audio summary.

17. The method of claim 1, further comprising receiving one or more user-specified categories for respective ones of the audio summaries while the audio summaries and the transition audio segments are being rendered.

18. The method of claim 17, further comprising building one or more playlists based on the one or more user-specified categories.

19. The method of claim 1, wherein at least one of the audio summaries is associated with a pointer to a location in a respective one of the audio pieces.

20. The method of claim 1, further comprising following a pointer from a given audio summary being rendered to a location in an associated audio piece specified by the pointer, and rendering the associated audio piece beginning at the specified location.

21. The method of claim 20, further comprising terminating the rendering of the associated audio piece and resuming the sequential rendering of the audio summaries and the transition audio segments.

22. The method of claim 21, wherein the terminating is initiated in response to user input.

23. The method of claim 21, wherein the terminating is initiated in response to completion of the rendering of the associated audio piece.

24. The method of claim 1, wherein the rendering comprises rendering only one transition audio segment between each sequential pair of the audio summaries.

25. The method of claim 1, wherein the identifying comprises identifying the audio summaries of the audio pieces based on links between the audio pieces and respective ones of the audio summaries.

26. An audio processing method, comprising:
sequentially rendering audio summaries and transition audio segments with at least one transition audio segment rendered between each pair of sequential audio summaries, wherein each audio summary comprises digital content summarizing at least a portion of a respective associated audio piece, wherein identical transition audio segments are rendered between pairs of sequential audio summaries and each identical transition audio segment corresponds to a Gabor function in a time domain representation.

27. An audio processing method, comprising:
sequentially rendering audio summaries and transition audio segments with at least one transition audio segment rendered between each pair of sequential audio summaries, wherein each of the audio summaries comprises digital content summarizing at least a portion of a respective associated audio piece;
receiving a user request to browse the audio summaries;
ordering ones of the audio summaries into a sequence in order of audio feature vector closeness to a given one of the audio summaries being rendered when the user request was received; and
rendering the sequence.

28. The method of claim 27, wherein audio summaries are rendered in accordance with the ordered sequence.

29. An audio processing method, comprising:
sequentially rendering audio summaries and transition audio segments with at least one transition audio segment rendered between each pair of sequential audio summaries, wherein each audio summary comprises digital content summarizing at least a portion of a respective associated audio piece, wherein each audio piece is associated with multiple audio summaries and a single audio summary is rendered automatically for each audio piece; and
rendering an audio summary for a given audio piece in response to user input received during rendering of a preceding audio summary associated with the given audio piece.

30. An audio processing system, comprising a rendering engine operable to perform operations comprising:
identifying audio summaries of respective audio pieces, wherein each of the audio pieces is associated with respective ones of audio summaries ranked into different levels of a respective audio summary hierarchy and in the identifying the rendering engine is operable to identify the respective levels into which the audio summaries are ranked;
determining transition audio segments each comprising a form of audio content that is different from the audio summaries and distinguishes the transition audio segment from the audio summaries;
concatenating the transition audio segments and ones of the audio summaries ranked at a selected level of the audio summary hierarchies into a sequence in which at least one of the transition audio segments is between sequential ones of the audio summaries; and
rendering the sequence.

31. The system of claim 30, wherein the rendering engine is operable to assign user-specified categories to respective ones of the audio pieces in response to user input.

32. The system of claim 31, wherein the rendering engine is operable to build a playlist based on the user-specified categories assigned to the ones of the audio pieces.

33. The system of claim 30, wherein the rendering engine is operable to render the audio summaries and the transition audio segments consecutively without any gaps between the audio summaries and the transition audio segments.

34. The system of claim 30, wherein the rendering engine is operable to receive one or more user-specified categories for ones of the audio summaries while the audio summaries and the transition audio segments are being rendered.

35. The system of claim 34, wherein the rendering engine is operable to build one or more playlists based on the one or more user-specified categories.

36. The system of claim 30, wherein the rendering engine is operable to follow a pointer from a given audio summary being rendered to a location in an associated audio piece specified by the pointer, and rendering the associated audio piece beginning at the specified location.

37. The system of claim 36, wherein the rendering engine is operable to terminate the rendering of the associated audio piece and resume the sequential rendering of the audio summaries and the transition audio segments.

38. The system of claim 30, wherein each transition audio segment corresponds to a monotone sound.

39. An audio processing system, comprising:
a rendering engine operable to sequentially render audio summaries and transition audio segments with at least one transition audio segment rendered between each pair of sequential audio summaries, wherein each of the audio summaries comprises digital content summarizing at least a portion of a respective associated audio piece and, in response to receipt of a user request to browse the audio summaries, the rendering engine is operable to order ones of the audio summaries into a sequence in order of audio feature vector closeness to a given one of the audio summaries being rendered when the user request was received and to render the sequence.

40. The system of claim 39, wherein the rendering engine is operable to render the audio summaries in accordance with the ordered sequence.

41. An audio processing system, comprising:
a rendering engine operable to sequentially render audio summaries and transition audio segments with at least one transition audio segment rendered between each pair of sequential audio summaries, wherein each audio piece is associated with multiple audio summaries, the rendering engine is operable to render a single audio summary automatically for each audio piece, and the rendering engine additionally is operable to render an audio summary for a given audio piece in response to user input received during rendering of a preceding audio summary associated with the given audio piece.

* * * * *